United States Patent
Miura et al.

(10) Patent No.: US 10,105,678 B2
(45) Date of Patent: Oct. 23, 2018

(54) OXYGEN ADSORBENT, OXYGEN MANUFACTURING EQUIPMENT USING THE OXYGEN ADSORBENT AND OXYGEN MANUFACTURING METHOD

(71) Applicants: TOKYO GAS CO., Ltd., Minato-ku (JP); Norio Miura, Fukuoka-shi (JP)

(72) Inventors: Norio Miura, Fukuoka-ken (JP); Hiroshi Ikeda, Fukuoka-ken (JP); Akinori Tsuchida, Fukuoka-ken (JP); Masaya Oi, Tokyo (JP); Kiyofumi Momma, Tokyo (JP); Toshinari Araki, Tokyo (JP)

(73) Assignees: TOKYO GAS CO., Ltd., Minato-ku (JP); Norio Miura, Fukuoka-shi (JP)

( * ) Notice: Subject to any disclaimer, the term of this patent is extended or adjusted under 35 U.S.C. 154(b) by 79 days.

(21) Appl. No.: 15/280,263

(22) Filed: Sep. 29, 2016

(65) Prior Publication Data

US 2017/0095791 A1    Apr. 6, 2017

(30) Foreign Application Priority Data

Oct. 2, 2015 (JP) ................. 2015-196559

(51) Int. Cl.
*B01D 53/04* (2006.01)
*B01J 20/06* (2006.01)
(Continued)

(52) U.S. Cl.
CPC .......... *B01J 20/041* (2013.01); *B01D 53/047* (2013.01); *B01J 20/06* (2013.01); *B01J 20/3433* (2013.01);
(Continued)

(58) Field of Classification Search
CPC .......... B01D 53/047; B01D 2253/1122; B01D 2253/1124; B01D 2257/104;
(Continued)

(56) References Cited

U.S. PATENT DOCUMENTS 6,059,858 A * 5/2000 Lin ...................... B01D 53/047
                                                        95/104
6,361,584 B1 * 3/2002 Stevens ................ B01D 53/047
                                                        95/138
(Continued)

FOREIGN PATENT DOCUMENTS

JP        2008-12439        1/2008

OTHER PUBLICATIONS

Machine generated English translation for JP 2008-012439 A, published Jan. 2008.*

(Continued)

*Primary Examiner* — Frank M Lawrence, Jr.
(74) *Attorney, Agent, or Firm* — Oblon, McClelland, Maier & Neustadt, L.L.P.

(57) ABSTRACT

An oxygen adsorbent which can be manufactured at a low cost, and an oxygen manufacturing equipment and an oxygen manufacturing method which are capable of producing oxygen-enriched gas at a low cost by using the oxygen adsorbent are provided. The oxygen adsorbent comprises at least an oxide of a perovskite structure. The oxide is represented by a compositional formula of $Sr_{1-x}Ca_xFeO_{3-\sigma}$, wherein $0.12 \leq x \leq 0.40$, $0 \leq \sigma \leq 0.5$. Since this oxide does not include La and Co included in a conventional oxygen adsorbent, it can be manufactured at a low cost.

3 Claims, 5 Drawing Sheets

(51) Int. Cl.
*C01B 13/02* (2006.01)
*B01J 20/04* (2006.01)
*B01D 53/047* (2006.01)
*B01J 20/34* (2006.01)

(52) U.S. Cl.
CPC ....... *B01J 20/3491* (2013.01); *C01B 13/0262* (2013.01); *B01D 2253/1122* (2013.01); *B01D 2257/104* (2013.01); *C01B 2210/0015* (2013.01)

(58) Field of Classification Search
CPC .......... C01B 13/0262; C01B 2210/0015; B01J 20/041; B01J 20/06; B01J 20/3433; B01J 20/3491
USPC ............... 96/108, 121; 95/96, 138; 252/184; 423/219; 502/525
See application file for complete search history.

(56) References Cited

U.S. PATENT DOCUMENTS 7,347,887 B2* 3/2008 Bulow .................... C01B 3/382
502/525
2015/0151239 A1* 6/2015 Fujimine .................. B01J 20/06
95/96

OTHER PUBLICATIONS

Kazuki Izumihara, "Oxygen sorption/desorption properties of Sr—Ca—Fe-based perovskite oxides" (with machine generated English translation), Master Degree in intermediate announcement Abstracts, 2015, 5 pgs.

Kazuki Izumihara, et al., "Oxygen sorption/desorption properties of Sr—Fe-based perovskite oxides" (with English Abstract and machine generated English translation), The Chemical Society of Japan, Kyushu branch, 2015, 2 pgs.

Kazuki Izumihara, et al., "Oxygen sorption/desorption properties of Sr—Ca—Fe-based perovskite oxides", The International Chemical Congress of Pacific Basin Societies 2015, 2015, 2 pgs.

* cited by examiner

OXYGEN ADSORBENT, OXYGEN MANUFACTURING EQUIPMENT USING THE OXYGEN ADSORBENT AND OXYGEN MANUFACTURING METHOD

The present application claims priority from Japanese patent application No. 2015-196559 filed on Oct. 2, 2015, the content of which is hereby incorporated by reference into this application.

BACKGROUND OF THE INVENTION

Field of the Invention

The present invention relates to an oxygen adsorbent, an oxygen manufacturing equipment using the oxygen adsorbent and an oxygen manufacturing method.

Description of the Related Art

There has been known a Pressure Swing Adsorption (PSA) method as a conventional technology to separate oxygen gas from a mixed gas including oxygen. The PSA method is a separation method that takes advantage of a phenomenon that the adsorption amount of oxygen to the oxygen adsorbent varies depending on the partial pressure of oxygen. The PSA method includes a step for introducing a mixed gas to an adsorption tower which is filled with the oxygen adsorbent so as to cause the adsorbent to selectively adsorb oxygen contained in the mixed gas (adsorption step), and a step for desorbing the oxygen from the oxygen adsorbent (from an interface of which the adsorbed substance is released) after the adsorption step (regeneration step).

There has been proposed $La_{1-x}Sr_xCo_{1-y}Fe_yO_{3-z}$ (wherein $0.0 \leq x \leq 1.0$, $0.0 \leq y \leq 1.0$, $z > 0$) as an oxygen adsorbent example in the PSA method (See Japanese Patent Application Laid-Open No. 2008-12439).

SUMMARY OF THE INVENTION

The $La_{1-x}Sr_xCo_{1-y}Fe_yO_{3-z}$ described in the Japanese Patent Application Laid-Open No. 2008-12439 is expensive since it includes La (lanthanum) and Co (cobalt) which are rare earth elements. Thus oxygen-enriched gas produced by the PSA process using $La_{1-x}Sr_xCo_{1-y}Fe_yO_{3-z}$ becomes costly. Therefore, an inexpensive oxygen adsorbent is required.

In view of such problem, an object of the present invention is to provide an oxygen adsorbent which can be manufactured at a low cost, and an oxygen manufacturing equipment which is capable of producing oxygen-enriched gas at a low cost by using the oxygen adsorbent and an oxygen manufacturing method.

In order to solve the above-mentioned problem, an oxygen adsorbent of the present invention includes: at least an oxide of a perovskite structure wherein said oxide is an oxide represented by a compositional formula of $Sr_{1-x}Ca_xFeO_{3-\sigma}$ wherein $0.12 \leq x \leq 0.40$, $0 \leq \sigma \leq 0.5$.

In order to solve the above-mentioned problem, an oxygen manufacturing equipment of the present invention includes: an adsorption tower configured to store an oxygen adsorbent which adsorbs oxygen under an environment of a predetermined pressure and a predetermined temperature; a mixed gas feed unit configured to feed a mixed gas, which contains oxygen and other substances than oxygen, into said adsorption tower; a separated gas discharge unit configured to discharge a separated gas from said adsorption tower, the separated gas being produced by removing oxygen from the mixed gas with said oxygen adsorbent adsorbing oxygen; and an adsorbed gas discharge unit configured to reduce an inner pressure of said adsorption tower to desorb, from the oxygen adsorbent, oxygen adsorbed on the oxygen adsorbent so as to discharge the desorbed oxygen from the adsorption tower, wherein said oxygen adsorbent comprises at least an oxide of a perovskite structure wherein said oxide is an oxide represented by a compositional formula of $Sr_{1-x}Ca_xFeO_{3-\sigma}$ wherein $0.12 \leq x \leq 0.40$, $0 \leq \sigma \leq 0.5$.

In order to solve the above-mentioned problem, an oxygen manufacturing method of the present invention includes following steps performed repeatedly: a feed step of feeding a mixed gas into an adsorption tower, said mixed gas containing oxygen and other substances than oxygen, said adsorption tower being configured to store an oxygen adsorbent which adsorbs oxygen under an environment of a predetermined pressure and a predetermined temperature, wherein said oxygen adsorbent comprises at least an oxide of a perovskite structure wherein said oxide is an oxide represented by a compositional formula of $Sr_{1-x}Ca_xFeO_{3-\sigma}$ wherein $0.12 \leq x \leq 0.40$, $0 \leq \sigma \leq 0.5$; an adsorption step of maintaining an interior of said adsorption tower in said environment of the predetermined pressure and the predetermined temperature, and causing said oxygen adsorbent to adsorb oxygen contained in the mixed gas; a separated gas discharge step of discharging, from said adsorption tower, a separated gas from which oxygen has been removed by performing said adsorption step; and an adsorbed gas discharge step of reducing an inner pressure of said adsorption tower to desorb, from the oxygen adsorbent, oxygen adsorbed on the oxygen adsorbent so as to discharge the desorbed oxygen from the adsorption tower.

According to the present invention, it is possible to provide an oxygen adsorbent which can be manufactured at a low cost, and an oxygen manufacturing equipment which is capable of producing oxygen-enriched gas at a low cost by using the oxygen adsorbent and an oxygen manufacturing method.

DETAIL DESCRIPTION OF THE EMBODIMENTS

Preferred embodiments of the present invention will be described in detail with reference to the accompanying drawings. It should be noted that specific dimensions, sizes, materials, values and the like indicated in the embodiments are mere examples for the sake of easier understanding of the present invention, and are not intended to limit the present invention unless otherwise mentioned. In this specification and the accompanying drawings, those elements and components which are substantially the same in function and structure are assigned the same reference numerals and redundant description for such elements and components is omitted. In addition, those elements and components which are not relevant to the present invention are not shown in the drawings.

Oxygen Manufacturing Equipment 100

Figure 1:
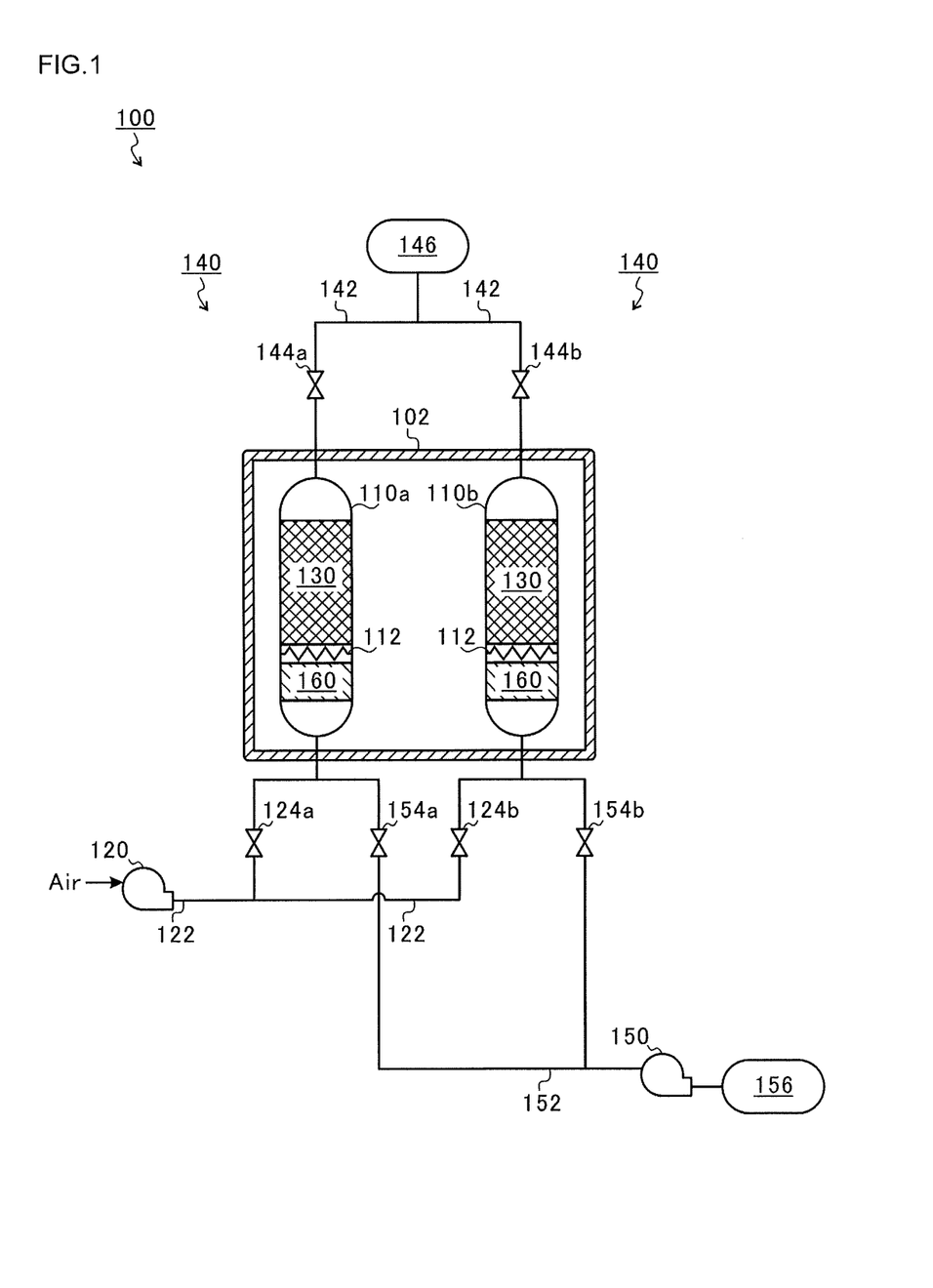
FIG. 1 is a diagram for explaining an oxygen manufacturing equipment.

FIG. 1 is a diagram for explaining an oxygen manufacturing equipment 100. The oxygen manufacturing equipment 100 of this embodiment uses a PSA method. The following description deals with an exemplary configuration that separates oxygen enriched gas and nitrogen enriched gas independently from the air.

As shown in FIG. 1, the oxygen manufacturing equipment 100 of this embodiment has adsorption towers 110 (designated at 110a and 110b in FIG. 1). Each of the adsorption towers 110 is configured to have a cylindrical shape. Further, the adsorption tower 110 is housed in a heat insulation chamber 102. The heat insulation chamber 102 maintains the temperature of the adsorption tower 110 storing an oxygen adsorbent 130, which will be described later, so as to expose the oxygen adsorbent 130 under an atmosphere of a predetermined temperature higher than 300° C. Heat supplied to the heat insulation chamber 102 may be heat that is generated by an electrical heater, by a gas combustion heater, or exhaust heat obtained from a plant in which the oxygen manufacturing equipment 100 is installed. Further, a heating part 112 is provided in the vicinity of the place where the oxygen adsorbent 130 is stored in the adsorption tower 110.

A mixed gas feed unit 120 includes a blower, and is configured to supply a mixed gas (air in this embodiment) that contains oxygen and other substances than oxygen into the adsorption towers 110. Specifically, the mixed gas feed unit 120 feeds the normal temperature air into the adsorption towers 110 through a feed pipe 122 and valves 124a, 124b.

The oxygen adsorbent 130 (indicated by the cross hatching in FIG. 1) is provided in each of the adsorption towers 110. Each adsorption towers 110 is filled up with the oxygen adsorbent 130. When the oxygen adsorbent 130 contacts the mixed gas under the environment of a predetermined pressure and a predetermined temperature, the oxygen adsorbent 130 adsorbs oxygen contained in the mixed gas and separates the oxygen from the mixed gas. The specific configuration of the oxygen adsorbent 130 will be described in detail later.

A separated gas discharge unit 140 discharges a nitrogen enriched gas (separated gas) from the adsorption towers 110. The nitrogen enriched gas is produced by the oxygen adsorbent 130 which adsorbs oxygen in the air and removes oxygen from the air. Specifically, the separated gas discharge unit 140 is configured to include a discharge pipe 142, and valves 144a and 144b. The nitrogen enriched gas discharged by the separated gas discharge unit 140 is sent through the discharge pipe 142 to a nitrogen tank 146. The nitrogen enriched gas stored in the nitrogen tank 146 is then sent to a following processing unit or facility.

An adsorbed gas discharge unit 150 includes a vacuum pump, and is configured to reduce an inner pressure of the adsorption towers 110 to desorb, from the oxygen adsorbent 130, oxygen adsorbed on the oxygen adsorbent 130 so as to discharge the desorbed oxygen from the adsorption towers 110. Specifically, the adsorbed gas discharge unit 150 discharges oxygen enriched gas (adsorbed gas) from the adsorption towers 110 through a discharge pipe 152 and valves 154a, 154b. The oxygen enriched gas discharged by the adsorbed gas discharge unit 150 is sent to an oxygen tank 156. The oxygen enriched gas stored in the oxygen tank 156 is then sent to a following processing unit or facility.

Each of heat reserving elements 160 (indicated by the hatching in FIG. 1) is arranged at an upstream side of the oxygen adsorbent 130 in the feeding direction of the air (mixed gas) in the adsorption towers 110. The air (mixed gas) supplied into the adsorption towers 110 from the mixed gas feed unit 120, and the oxygen enriched gas discharged from an interior of the adsorption towers 110 by the adsorbed gas discharge unit 150 flow through the heat reserving elements 160.

It is preferable to use a heat reserving element 160 having characteristics of a low pressure loss of fluid when the fluid passes through the heat reserving element, and a large capacity of amount of stored heat. For example, each heat reserving element 160 has a honeycomb structure made from a stainless steel heat-reserving material, with a liner pitch being approximately 2 mm and a plate thickness being approximately 0.5 mm.

Oxygen Manufacturing Method

Figure 2:
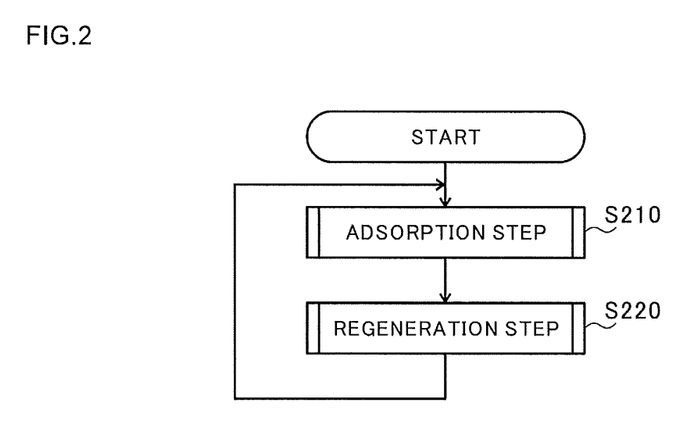
FIG. 2 is a flowchart for explaining a process flow of an oxygen manufacturing method.

Then, an oxygen manufacturing method which uses the oxygen manufacturing equipment 100 will be described. FIG. 2 shows a flowchart for explaining a process flow of an oxygen manufacturing method.

As shown in FIG. 2, an adsorption step S210 and a regeneration step S220 are repeated in the adsorption tower 110. Under an initial condition, a control unit (not shown) closes the valves 124a, 124b, 144a, 144b, 154a and 154b, and exposes the oxygen adsorbent 130 under an atmosphere of the predetermined temperature higher than 300° C. in the adsorption towers 110. In the present embodiment, while the adsorption step S210 is being carried out in the adsorption tower 110a, the regeneration step S220 is parallelly carried out in the adsorption tower 110b. While the regeneration step S220 is carried out in the adsorption tower 110a, the adsorption step S210 is parallelly carried out in the adsorption tower 110b.

As will be described later, the nitrogen enriched gas is produced in the adsorption step S210, and the oxygen enriched gas is produced in the regeneration step S220. Therefore, since the adsorption towers 110a and 110b exclusively and alternately perform the adsorption step S210 and the regeneration step S220, it is possible to continuously produce the nitrogen enriched gas and the oxygen enriched gas.

In the following description, the processes of the adsorption step S210 and the regeneration step S220 will be described in detail in connection with the adsorption tower 110a. The description of the adsorption step S210 and the regeneration step S220 to be performed in the adsorption tower 110b are omitted as those are substantially the same as the processes in the adsorption tower 110a.

Adsorption Step: S210

Figure 3:
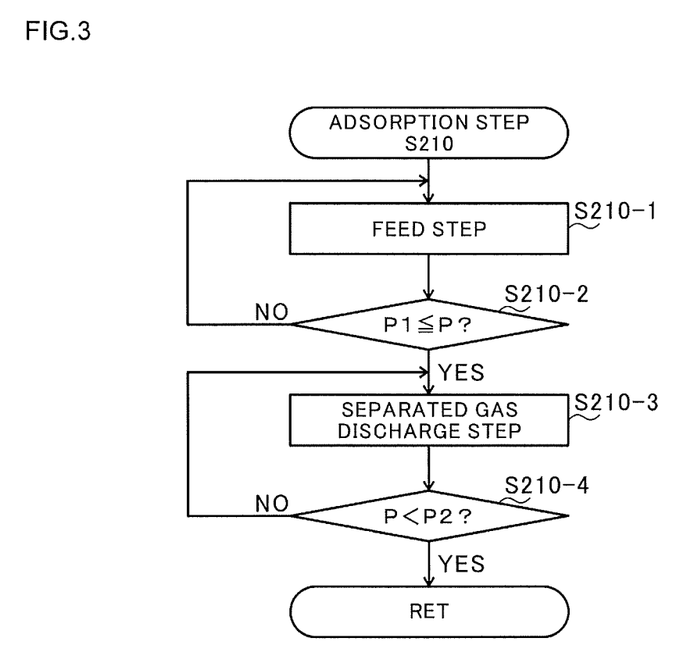
FIG. 3 is a flowchart for explaining a process flow of an adsorption step.

FIG. 3 shows a flowchart to describe the process in the adsorption step S210.

Feed Step: S210-1

The control unit (not shown) drives the mixed gas feed unit 120, opens the valve 124a, and supplies the air (mixed gas) into the adsorption tower 110a (feeding process). In other words, the air at the normal temperature arrives at the oxygen adsorbent 130 via the heat reserving element 160.

Adsorption Step: S210-2

The control unit determines whether a pressure P in the adsorption tower 110a becomes equal to or more than a predetermined pressure P1 (e.g., from 100 kPa to 200 kPa) or not. The control unit carries out the feed step S210-1 until the inner pressure P of the adsorption tower 110a becomes equal to or more than the predetermined pressure P1 (NO at Step S210-2). Oxygen in the air (mixed gas) is adsorbed by the oxygen adsorbent 130 while the control unit carries out the feeding process and the pressure in the adsorption tower 110a rises to the predetermined pressure P1. On the other hand, when the pressure P in the adsorption tower 110a becomes equal to or more than the predetermined pressure P1 (YES at Step S210-2), the control unit deactivates the mixed gas feed unit 120 and proceeds to the separated gas discharge step S210-3 which will be described.

Separated Gas Discharge Step: S210-3

When the pressure P in the adsorption tower 110a becomes equal to or more than the predetermined pressure P1 (YES at Step S210-2), the control unit closes the valve 124a and opens the valve 144a. This causes the separated gas discharge unit 140 to discharge the nitrogen enriched gas, which is produced by removing oxygen from the air with the oxygen adsorbent 130, from the adsorption tower 110a (separated gas discharge process). Then the nitrogen enriched gas discharged from the adsorption tower 110a is sent to the nitrogen tank 146.

Separated Gas Discharge Determination Step: S210-4

Then, the control unit determines whether the pressure P in the adsorption tower 110a becomes lower than a predetermined pressure P2 (e.g., 60 kPa) or not. The control unit carries out the separated gas discharge step S210-3 until the pressure P in the adsorption tower 110a becomes lower than the predetermined pressure P2 (NO at Step S210-4). When the pressure P in the adsorption tower 110a becomes lower than the predetermined pressure P2 (YES at Step S210-4), the control unit determines that the adsorption step S210 is completed, and then proceeds to the regeneration step S220 which will be described below.

Regeneration Step: S220

Figure 4:
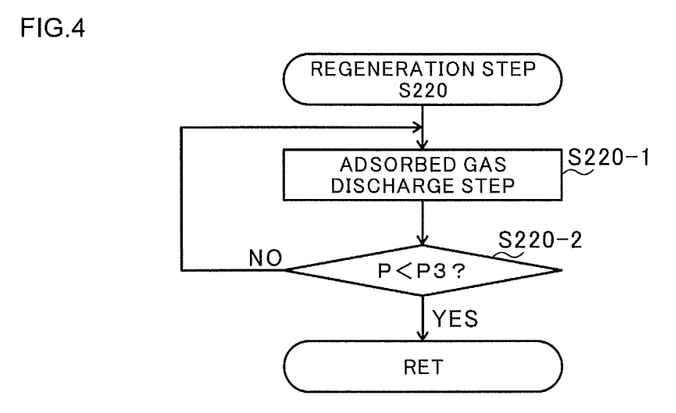
FIG. 4 is a flowchart for explaining a process flow of a regeneration step.

FIG. 4 shows a flowchart useful to describe the process in the regeneration step S220.

Adsorbed Gas Discharge Step: S220-1

When the above-described separated gas discharge determination step S210-4 determines that the inner pressure P of the adsorption tower 110a is lower than the predetermined pressure P2 (YES at Step S210-4), the control unit closes the valve 144a, opens the valve 154a, and drives the adsorbed gas discharge unit 150. This reduces the pressure in the adsorption tower 110a, and then causes oxygen, which is adsorbed by the oxygen adsorbent 130, to desorb from the oxygen adsorbent 130 and to be discharged from the adsorption tower 110a (adsorbed gas discharge step). In other words, the oxygen enriched gas with a high temperature (300° C. or more) is discharged via the heat reserving element 160, and the normal temperature heat reserving element 160 is heated by the oxygen enriched gas with a high temperature. At the same time, the high temperature oxygen enriched gas is cooled by the normal temperature heat reserving element 160. The oxygen enriched gas discharged from the adsorption tower 110a is sent to the oxygen tank 156.

Adsorbed Gas Discharge Determination Step: S220-2

Then, the control unit determines whether the pressure P in the adsorption tower 110a becomes lower than a predetermined pressure P3 (e.g., from 2 kPa to 20 kPa) or not. The control unit carries out the adsorbed gas discharge step S220-1 until the pressure P in the adsorption tower 110a becomes lower than the predetermined pressure P3 (NO at Step S220-2). When the pressure P in the adsorption tower 110a becomes lower than the predetermined pressure P3 (YES at Step S220-2), the control unit determines that the regeneration step S220 is completed, and closes the valve 154a. The processes from the adsorption step S210 are repeated.

Therefore, in the adsorption step S210 which is performed subsequently to the regeneration step S220, the air with the normal temperature introduced into the adsorption tower 110 by the mixed gas feed unit 120 is preheated by the heat reserving element 160 which has been heated in the regeneration step S220. By this, it is possible to reduce the energy required to heat the oxygen adsorbent 130, and it is possible to reduce the electric power consumption rate required to heat the oxygen adsorbent 130. That is, it is possible to manufacture the nitrogen enriched gas and the oxygen enriched gas at a low cost.

Oxygen Adsorbent 130

The following describes the oxygen adsorbent 130 which selectively adsorbs oxygen. The oxygen adsorbent 130 of this embodiment is one of oxides of a perovskite structure represented by a compositional formula of $Sr_{1-x}Ca_xFeO_{3-o}$ (wherein $0.12 \leq x \leq 0.40$, $0 \leq o \leq 0.5$).

The oxides of perovskite structure can be utilized as the oxygen adsorbent 130 because having a capability of adsorbing oxygen selectively in the bulk at a given temperature.

Thus, the present inventors focused on, among the oxides of perovskite structure oxide, some having a compositional formula $Sr_{1-x}Ca_xFeO_{3-o}$, in particular, and produced plural oxides of perovskite structure having various values of x to measure the oxygen adsorption amounts thereof.

Figure 5:
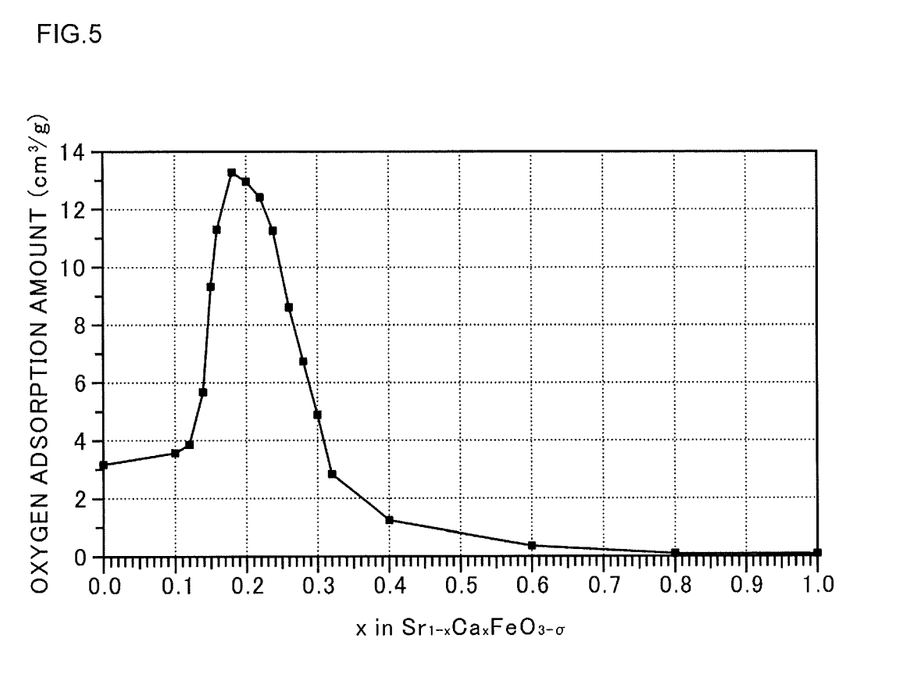
FIG. 5 is a graph for explaining a relationship between a value of x in a compositional formula $Sr_{1-x}Ca_xFeO_{3-\sigma}$ and an oxygen adsorption amount.

FIG. 5 is a graph for explaining a relationship between a value of x in a compositional formula $Sr_{1-x}Ca_xFeO_{3-o}$ and an oxygen adsorption amount. In FIG. 5, the horizontal axis denotes values of x in a compositional formula $Sr_{1-x}Ca_xFeO_{3-o}$ and the vertical axis denotes oxygen adsorption amounts ($cm^3/g$). In addition, values of x in the compositional formula $Sr_{1-x}Ca_xFeO_{3-o}$ are based on amounts of raw materials (weight of raw materials) just before oxides are produced. Further, regarding three oxides of x=0.2, x=0.24 and x=0.28, those three values of x were measured by using the Inductively Coupled Plasma-Atomic Emission Spectrometry (ICP-AES). As a result, it was confirmed that those three values of x coincided with the amounts of raw materials (weight of raw materials).

Respective oxygen adsorption amounts of the oxides at 550° C. were measured. As shown in FIG. 5, it was confirmed that the oxygen adsorption amount of compositional formula $Sr_{1-x}Ca_xFeO_{3-o}$ is approximately 3.2 $cm^3/g$ when x=0.0, and is approximately 3.6 $cm^3/g$ when x=0.10.

However, it was found that oxygen adsorption amounts increase rapidly when x=0.10 or more up to x=0.18. Namely, the oxygen adsorption amount is approximately 3.9 $cm^3/g$ when x=0.12, is approximately 5.7 $cm^3/g$ when x=0.14, is approximately 9.3 $cm^3/g$ when x=0.15, is approximately 11.3 $cm^3/g$ when x=0.16, and is approximately 13.3 $cm^3/g$ when x=0.18.

Further, it was confirmed that the oxygen adsorption amount is approximately 13.0 $cm^3/g$ when x=0.20, is approximately 12.4 $cm^3/g$ when x=0.22, is approximately 11.3 $cm^3/g$ when x=0.24, is approximately 8.6 $cm^3/g$ when x=0.26, is approximately 6.7 $cm^3/g$ when x=0.28, is approximately 4.9 $cm^3/g$ when x=0.30, is approximately 2.8 $cm^3/g$ when x=0.32, is approximately 1.3 $cm^3/g$ when x=0.40, is approximately 0.4 $cm^3/g$ when x=0.60, and is approximately 0.1 $cm^3/g$ when x=0.80 and x=1.0.

As mentioned above, it was confirmed that the perovskite structure oxide represented by the compositional formula $Sr_{1-x}Ca_xFeO_{3-o}$ (wherein $0.12 \leq x \leq 0.40$, $0 \leq o \leq 0.5$) is capable of adsorbing oxygen efficiently. Particularly, it was confirmed that an oxygen adsorption capacity of the perovskite structure oxide represented by a compositional formula $Sr_{1-x}Ca_xFeO_{3-\sigma}$ (wherein $0.14 \leq x \leq 0.30$, $0 \leq \sigma \leq 0.5$) is higher than that of $La_{1-x}Sr_xCo_{1-y}Fe_yO_{3-z}$ (referred to as simply "LSCF" hereinafter).

Further, the perovskite structure oxide represented by the compositional formula $Sr_{1-x}Ca_xFeO_{3-\sigma}$ (wherein $0.14 \leq x \leq 0.30$, $0 \leq \sigma \leq 0.5$) has an oxygen adsorption capacity (of approximately 3 times at x=0.18) higher than that of LSCF. Therefore, in case of adopting the perovskite structure oxide represented by the compositional formula $Sr_{1-x}Ca_xFeO_{3-\sigma}$ (wherein $0.14 \leq x \leq 0.30$, $0 \leq \sigma \leq 0.5$) as the oxygen adsorbent 130 to the oxygen manufacturing equipment 100, when producing the same amount of the oxygen enriched gas as a conventional LSCF adopted oxygen manufacturing equipment, it is possible for the oxygen manufacturing equipment 100 to reduce the usage amount of oxygen adsorbents 130 (to approximately ⅓ when oxides of x=0.18) in comparison with the conventional LSCF adopted oxygen manufacturing equipment. Therefore, it is possible to reduce the cost required for the oxygen adsorbent 130 itself. It is also possible to reduce the cost (initial cost) required for the oxygen manufacturing equipment 100 itself.

Further, since the usage amount of the oxygen adsorbent 130 is reduced, it is possible to reduce the energy required to heat the oxygen adsorbent 130 (to approximately ⅓ when oxides of x=0.18). Therefore, since the electric power consumption rate required to heat the oxygen adsorbent 130 is reduced (to approximately ⅓ when oxides of x=0.18), it is possible to produce the oxygen enriched gas and the nitrogen enriched gas at a low cost (The running cost can be reduced.).

Further, since the perovskite structure oxide represented by the compositional formula $Sr_{1-x}Ca_xFeO_{3-\sigma}$ (wherein $0.14 \leq x \leq 0.30$, $0 \leq \sigma \leq 0.5$) has a high oxygen adsorption capacity, it is possible to increase the pressure at the time of desorption in the oxygen manufacturing equipment 100 to which the particular oxide is adopted as the oxygen adsorbent 130, in comparison with a conventional LSCF adopted oxygen manufacturing equipment, even when producing the same amount of the oxygen enriched gas as the conventional LSCF adopted oxygen manufacturing equipment. That is, it is possible to desorb oxygen at a low vacuum in comparison with a conventional oxygen manufacturing equipment. Therefore, it is possible to reduce the electric power consumption rate required for the adsorbed gas discharge unit 150 (vacuum pump) when desorbing oxygen (regeneration step S220), and thus the running cost can be reduced.

Further, the oxide of perovskite structure represented by the compositional formula $Sr_{1-x}Ca_xFeO_{3-\sigma}$ (wherein $0.12 \leq x \leq 0.40$, $0 \leq \sigma \leq 0.5$) does not include expensive La and Co compared with LSCF. In other words, it is possible to reduce the cost (material cost) in manufacturing the oxide represented by the compositional formula $Sr_{1-x}Ca_xFeO_{3-\sigma}$ (wherein $0.12 \leq x \leq 0.40$, $0 \leq \sigma \leq 0.5$). Therefore, by using oxides of perovskite structure represented by the compositional formula $Sr_{1-x}Ca_xFeO_{3-\sigma}$ (wherein $0.125 \leq x \leq 0.40$, $0 \leq \sigma \leq 0.5$) as the oxygen adsorbent 130, it is possible to reduce the cost of the oxygen adsorbent 130 itself.

Although the preferred embodiments of the present invention are described in the foregoing with reference to the accompanying drawings, it goes without saying that the present invention is not limited to these embodiments. It is obvious that a skilled person can make or conceive various changes and modifications to the embodiments within the scope of the present invention as claimed. It is natural that such changes and modifications are also encompassed by the present invention. For example, in the foregoing embodiments, the oxide of perovskite structure represented by the compositional formula $Sr_{1-x}Ca_xFeO_{3-\sigma}$ (wherein $0.12 \leq x 0.40$, $0 \leq \sigma \leq 0.5$) has been described as an example of the oxygen adsorbent 130. However, as long as the oxygen adsorbent 130 includes at least the oxide of perovskite structure represented by the compositional formula $Sr_{1-x}Ca_xFeO_{3-\sigma}$ (wherein $0.12 \leq x \leq 0.40$, $0 \leq \sigma \leq 0.5$), a layered perovskite compound may be included for example.

Further, the pressure range of the interior of the adsorption tower 110 of the oxygen manufacturing equipment 100 described in the foregoing embodiment is merely an example. The oxygen adsorbent 130 may be changed within a pressure range from 1000 Pa to 200000 Pa (or $10^{-2}$ atm to 2 atm) in oxygen partial pressure, for example.

Further, in the foregoing embodiment, there has been described the case where the adsorption and the regeneration are performed in parallel in the adsorption tower 110a and the adsorption tower 110b because the oxygen manufacturing equipment 100 having two of the adsorption towers 110a, 110b is illustrated. However, the number of the adsorption tower 110 is not limited to two, as long as the oxygen adsorbent 130, including at least the perovskite structure oxide represented by the compositional formula $Sr_{1-x}Ca_xFeO_{3-\sigma}$ (wherein $0.12 \leq x 0.40$, $0 \leq \sigma \leq 0.5$), is stored in the adsorption tower 110. That is, the number of the adsorption tower 110 may be one or may be three or more.

Further, in the foregoing embodiments, the heat reserving elements 160, which consists of a stainless steel heat storage material honeycomb, has been described as an example. However, there is no limitation on the material of the heat reserving elements 160. The heat reserving elements 160 may be composed of the same material as the oxygen adsorbent 130, for example. With this configuration, it becomes possible to separate the oxygen enriched gas and the nitrogen enriched gas in the heat reserving element 160.

Furthermore, the heat reserving elements 160 may be composed of a substance (another adsorbent such as activated carbon (MSC: Molecular Sieving Carbon), composite oxides operating at a low temperature or the like) that adsorbs oxygen and separates nitrogen when being in contact with air (mixed gas) under environment of the predetermined pressure and a temperature closer to room temperature than the oxygen adsorbent 130. Thus, the heat reserving elements 160 enables to separate the oxygen enriched gas and the nitrogen enriched gas more efficiently.

INDUSTRIAL APPLICABILITY

The present invention can be used in the oxygen adsorbent, the oxygen manufacturing equipment using the oxygen adsorbent and the oxygen manufacturing method.

What is claimed is:
1. An oxygen adsorbent, comprising at least an oxide of a perovskite structure wherein said oxide is an oxide represented by a compositional formula of $Sr_{1-x}Ca_xFeO_{3-\sigma}$ wherein $0.12 \leq x \leq 0.40$, $0 \leq \sigma \leq 0.5$.
2. An oxygen manufacturing equipment comprising:
an adsorption tower comprising an oxygen adsorbent which adsorbs oxygen under an environment of a predetermined pressure and a predetermined temperature;
a mixed gas feed unit configured to feed a mixed gas, which comprises oxygen and other substances than oxygen, into said adsorption tower;
a separated gas discharge unit configured to discharge a separated gas from said adsorption tower, the separated gas being produced by removing oxygen from the mixed gas with said oxygen adsorbent adsorbing oxygen; and an adsorbed gas discharge unit configured to reduce an inner pressure of said adsorption tower to desorb, from the oxygen adsorbent, oxygen adsorbed on the oxygen adsorbent so as to discharge the desorbed oxygen from the adsorption tower, wherein said oxygen adsorbent comprises at least an oxide of a perovskite structure wherein said oxide is an oxide represented by a compositional formula of $Sr_{1-x}Ca_xFeO_{3-\sigma}$ wherein $0.12 \leq x \leq 0.40$, $0 \leq \sigma \leq 0.5$.

3. An oxygen manufacturing method comprising, feeding a mixed gas comprising oxygen and other substances than oxygen into an adsorption tower, said adsorption tower comprising an oxygen adsorbent which adsorbs oxygen under an environment of a predetermined pressure and a predetermined temperature, wherein said oxygen adsorbent comprises at least an oxide of a perovskite structure wherein said oxide is an oxide represented by a compositional formula of $Sr_{1-x}Ca_xFeO_{3-\sigma}$ wherein $0.12 \leq x \leq 0.40$, $0 \leq \sigma \leq 0.5$;

absorbing oxygen contained in the mixed gas with said oxygen adsorbent by maintaining an interior of said adsorption tower in said environment of the predetermined pressure and the predetermined temperature;

discharging, from said adsorption tower, a separated gas from which oxygen has been removed by said absorbing; and reducing an inner pressure of said adsorption tower to desorb, from said oxygen adsorbent, oxygen adsorbed on said oxygen adsorbent so as to discharge the desorbed oxygen from the adsorption tower.

* * * * *

UNITED STATES PATENT AND TRADEMARK OFFICE
CERTIFICATE OF CORRECTION

PATENT NO. : 10,105,678 B2
APPLICATION NO. : 15/280263
DATED : October 23, 2018
INVENTOR(S) : Norio Miura et al.

It is certified that error appears in the above-identified patent and that said Letters Patent is hereby corrected as shown below:

In the Specification

Column 6, Line 16 "(wherein $0.12 \leq x0.40$," should read --(wherein $0.12 \leq x \leq 0.40$,--

Column 6, Line 64 "(wherein $0.12 \leq x0.40$," should read --(wherein $0.12 \leq x \leq 0.40$,--

Column 7, Line 49 "$0.12 \leq x0.40$," should read --$0.12 \leq x \leq 0.40$,--

Column 7, Line 55 "(wherein $0.125 \leq x \leq 0.40$," should read --(wherein $0.12 \leq x \leq 0.40$,--

Column 8, Line 2 "$0.12 \leq x0.40$," should read --$0.12 \leq x \leq 0.40$,--

Column 8, Line 24 "(wherein $0.12 \leq x0.40$," should read --(wherein $0.12 \leq x \leq 0.40$,--

Signed and Sealed this
Twenty-fourth Day of September, 2019

Andrei Iancu
*Director of the United States Patent and Trademark Office*